Figure 1:
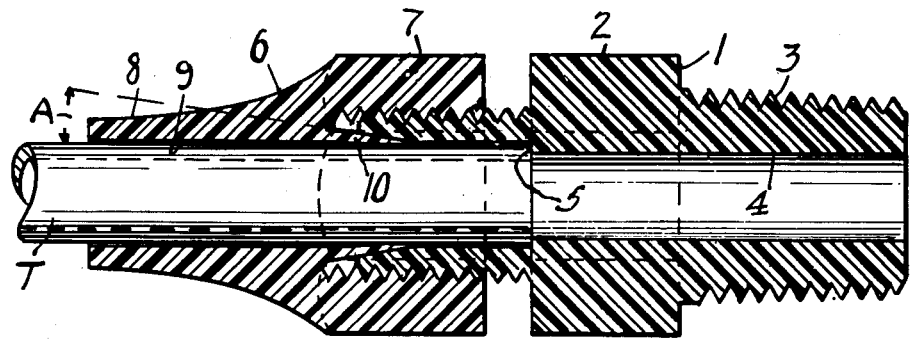

July 17, 1956   A. W. JACOBS   2,755,110
SYNTHETIC RESIN GLAND TYPE COUPLING FOR TUBES
Filed Feb. 12, 1954

INVENTOR.
ARTHUR W. JACOBS.
BY
Oberlin & Limbach
ATTORNEYS.

United States Patent Office 2,755,110
Patented July 17, 1956

2,755,110

SYNTHETIC RESIN GLAND TYPE COUPLING FOR TUBES

Arthur W. Jacobs, Berea, Ohio

Application February 12, 1954, Serial No. 409,919

1 Claim. (Cl. 285—331)

The present invention relates generally as indicated to a coupling for tubes and more particularly to a coupling which does not require the flaring, beading, or other forming of an end portion of a tube prior to joining thereof to the coupling.

There are, of course, many types of tube couplings now available on the market, in some of which the end portion of the tube is flared, beaded, or otherwise formed with an enlargement for clamping and sealing between opposed surfaces of threaded together coupling members, and in others of which, a ring or sleeve member slipped over the tube end is wedged or cammed between the threaded together coupling members and is thus deformed into frictional clamping engagement with the tube to become, in effect, an enlargement of the tube. In some instances, the ring or sleeve is designed to bite or cut into the surface of the tube. There are, of course, many other tube couplings which employ rubber or like rings which, upon compression between the threaded coupling members, are deformed radially into frictional gripping and sealing engagement with the tube.

The couplings of the "flareless tube type" which include deformable rings of lead, copper, bronze, steel, or any other metal are not elastically contractible or elastically expansible; and, therefore, once the coupling has been assembled with a tube, said ring becomes a part of the tube and therefore is not re-useable. Moreover, the deformation of the ring forms a corresponding depression in the surface of the tube (even in the case of the rubber rings), thereby constricting the tube, and in the case of a metal ring, the ring and tube are locked together. Moreover, the flared, beaded, and cut-into tubes are seriously weakened insofar as vibration is concerned, whereupon after relatively short use on equipment subject to vibration, the tubes fail at the flare or bead or at the point of such cutting or biting in.

Referring further to elastic contraction or expansion of said deformable metal rings as used in flareless tube couplings, it is to be noted that even with only a .001" initial radial clearance between, for example, a ¼" diameter tube and the continuous ring therearound, the ring will have to be contracted over .006" in its .7854" inner circumference just to come into contact around the tube. Such contraction of metals obviously will exceed the microscopic amount of elastic deformation thereof; and, therefore, once a metal ring has been contracted to firmly grip a tube, it no longer returns to its original size but, instead, becomes a permanent part of the tube. Axial slotting of such metal ring will overcome the foregoing difficulty as to deformation, but then a fluid-tight seal must be obtained by a rubber or rubber-like ring.

In view of the foregoing, it is one principal object of this invention to provide a flareless tube coupling in which the ferrule or deformable ring has great strength and yet is elastically deformable to form, not only a fluid-tight seal around the tube clamped thereby, but to exert a strong, gripping pressure along an extended area of the tube.

Another object of this invention is to provide a flareless tube coupling in which at least the deformable ferrule or deformable ring portion thereof is fabricated of nylon to provide great strength while having the ability to be elastically deformed, that is, to be expanded, upon thrusting of the tube therethrough, and to be contracted into tight gripping and sealing engagement around the tube.

Another object of this invention is to provide a two-piece coupling which is fabricated entirely from nylon to provide the features mentioned in the preceding paragraph, and, in addition, to provide vibration resistance, chemical inertness with reference to certain acids, strong alkalies, hydrocarbons, lacquer solvents, refrigerants, etc., and mechanical and thermal shock resistance. Moreover, the coupling parts, when fabricated of nylon, do not become brittle even at temperatures of −70° F. and are form-stable even at temperatures above 400° F. Another desirable characteristic is that no lubrication or coating of threads of the nylon coupling parts is necessary in order to prevent seizing or galling. Still another important characteristic is that, because of the fluidity of the nylon during molding, injection molded coupling parts may be made with very thin and sharp sections and need not be machined at all, thereby effecting substantial economies in cost while providing a superior coupling.

Another object of this invention is to provide a tube coupling in which the ferrule or deformable ring is elastically deformable so that the same may be re-used any number of times.

Another object of this invention is to provide a tube coupling in which the elastically deformable ferrule or ring tapers in cross-section to a feather edge so as to effect a fluid-tight seal around the tube even though the outer surface of the tube may not be perfectly smooth and scratch-free.

Another object of this invention is to provide a tube coupling in which the elastically deformable portion thereof is integrally formed with a threaded portion of the coupling for bodily contraction about its anchored end to effect gripping of an extended portion of the tube with a gradually relaxing pressure to further enhance the vibration-resisting characteristics of the coupling.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 2:
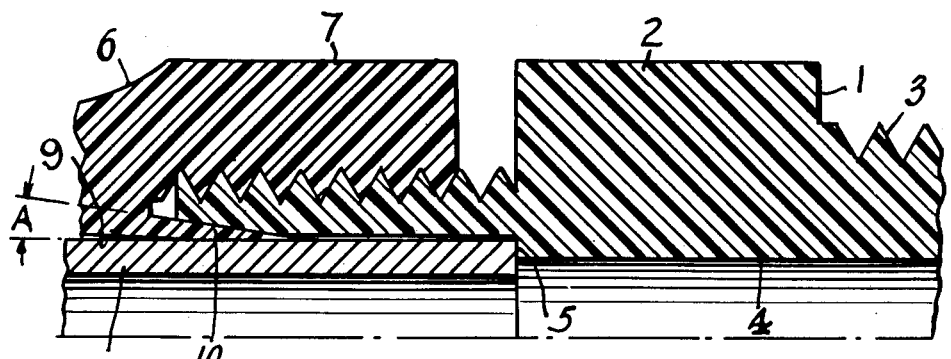
Figure 3:
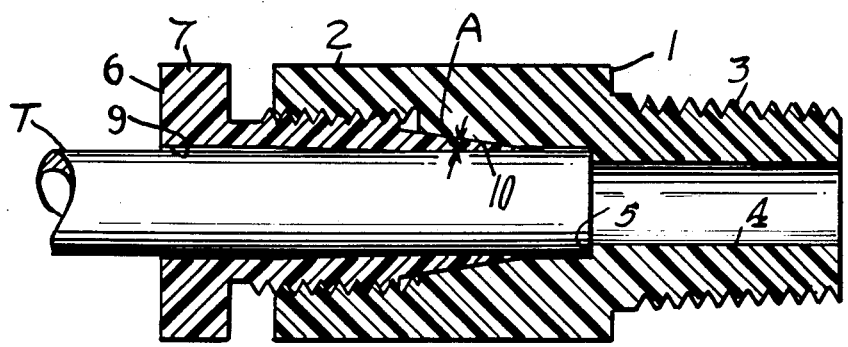

In said annexed drawing:

Fig. 1 is a cross-section view of a tube coupling according to the present invention, said coupling being shown assembled in finger-tight condition just before deformation of the ferrule commences;

Fig. 2 is a fragmentary cross-section view on a somewhat enlarged scale showing the coupling of Fig. 1 in its normally wrench-tightened condition effective to form a fluid-tight seal around the tube therein and to firmly grip the tube against blow-out by pressure; and Fig. 3 is a cross-section view of a modified form of the present invention differing only in that the ferrule member is provided with external threads and the other cooperating coupling member is provided with internal threads, the principles of the invention being the same in either event.

Referring now to Fig. 1, there is shown a coupling member 1 which obviously may be an elbow, T, cross, or other shape rather than the straight coupling member shown. This coupling member 1 has a portion 2 providing parallel flats for wrench engagement and one end is formed with a tapered pipe thread 3 or the like for screwing into a valve body or other piece of equipment or machinery provided with a female pipe thread.

The other end of said coupling member 1 is threaded as shown, and the bore 4 through said coupling member provides a stop shoulder 5 for the end of a tube T adapted to be inserted thereinto. The large portion of bore 4 is preferably about .004" larger in diameter than the tube T adapted to be inserted therewithin. Thus, if the tube is, say, .250" diameter, the large part of bore 4 will be .254" diameter.

The end of the bore 4 is flared, as shown, at an angle A which may be about 9–15°, 9° being the preferred angle; and in the case of ¼" diameter inch tubing T, for example, the length of the flared portion will be approximately equal to the diameter of the tubing, that is, approximately ³⁄₁₆–¼" long, whereby the radial distance between the end of the flare and the outside diameter of the tube will be approximately .030–.040".

Threadedly engaged with said coupling member is a coupling member or ferrule 6 which is formed with a wrench-engaging portion 7 at one end and a tube-supporting tapered extension 8 at the other end, the bore 9 through said ferrule preferably being about the same as the large part of bore 4 in the coupling member 1 and gradually tapering at such one end to a diameter slightly less than that of the tube T. Said ferrule 6 is integrally formed, within the threaded portion thereof, with a tapered projection 10 which is of the same taper as the flare in member 1 and which tapers to a sharp feather edge. Thus, when the ferrule 6 is threaded onto the coupling member 1 and a tube T is inserted as shown in Fig. 1, the tapered projection 10 will first be elastically expanded around the tube by reason of bore 9 being smaller than the tube. In Fig. 1, the clearances are somewhat exaggerated, but, as apparent, even without having tightened the ferrule 6 with wrench pressure, that is, just screwing the parts 1 and 6 together finger tight, the tube T will be firmly supported against lateral movement and tilting; and even in this condition of the assembly, it will be essentially fluid-tight.

Now, when the ferrule 6 is tightened with wrench pressure, about ½ to 1 turn beyond finger tight, the projection 10 thereof will, by reason of its engagement in the flare of the coupling member 1, be deformed radially inward into fluid-tight sealing engagement around the outer surface of the tube T for the entire length of the flared portion and into firm gripping engagement with the tube T. It is to be noted that the feather edge is sealed around the tube T, and that the pressure of fluid acting thereon around the outside tends to press the feather edge even tighter against the tube T.

The deformation of the tapered portion 10 of the ferrule 6, as just described, is a cantilever beam action about the end thereof which is molded integrally with the ferrule and by reason of the fact that said ferrule is made of nylon, it will be elastically contractible so that, upon loosening thereof, the tube T may be slipped out of the coupling, and in again, any number of times. In other words, the making of the ferrule 6, and preferably the coupling member 1 too, of nylon renders the coupling reuseable any number of times.

The preferred nylon which is used is known as molding material FM–10001 which is characterized by its relatively great hardness of Rockwell R 118, tensile strength of 10,900 p. s. i., elongation 50%, modulus of elasticity of 400,000 p. s. i., flexural strength of 14,600 p. s. i., stiffness of 290,000 p. s. i., and impact strength (Izod) of .94 ft.-lb./inch of notch. In the present case, the nylon ferrule 6 is elastically deformable, and yet is strong as distinguished from rubber and rubber-like plastic materials. Continuous ferrules of metal such as lead, brass, steel, bronze, etc. when radially inwardly deformed to the extent required in coupling of flareless tubes will not elastically spring back to their original sizes.

On the other hand, rubber or rubber-like materials have not been found to be satisfactory in that the softer rubbers such as chlorinated rubber and isomerized rubber, and plastic materials such as polyethylene, vinylidene chloride, and cellulose compounds are relatively weak and have relatively low heat resistance. Also, such rubber or rubber-like materials cold flow under pressure, whereby the coupling member or ferrule 6 must be periodically tightened in order to maintain a firm grip on the tube T and a fluid-tight seal therearound. Of course, hard rubber, methyl methacrylate, polystyrene, phenol formaldehyde and urea formaldehyde, while having tensile strengths comparable to that of nylon, lack impact strength and elastic deformation properties, and the tapered extension 8 cannot be made with a feather edge by molding or machining without crumbling or breaking upon deformation.

As already mentioned, by fabricating the entire coupling herein from nylon, vibrations are not transmitted through the coupling to the tube T, and therefore vibration failures are unheard of in my coupling. The tight frictional gripping of the tube T is along an extended surface of the tube and normally does not entail any visible or detrimental deformation of the tube wall, although it is possible to overtighten the ferrule 6; but, even then, the deformation of the tube will be barely noticeable in the case of tubes T of strong metal or of heavy wall thickness. Moreover, the grip on the tube T is gradually relaxed whereby to avoid stress concentration.

In Fig. 3, the same reference numerals have been used as in Figs. 1 and 2 to denote the same or similar elements of the coupling, and therefore repetition of the description is not necessary except to point out that, essentially, the only difference between the Fig. 1 and Fig. 3 couplings is that the coupling member 1 is formed with internal threads and the coupling member or ferrule 6 is formed with external threads. Thus, the Fig. 3 coupling has the same attributes as the Fig. 1 coupling insofar as the effecting of a fluid-tight seal with a tube T and the firm gripping thereof is concerned.

Nylon tube couplings according to the present invention now make feasible the use of aluminum tubing in refrigerators. Hitherto, only copper tube and brass fittings have been employed because of electrolytic action between aluminum tube and brass fittings and, of course, the use of aluminum tube with aluminum fittings has been considered, but without success, because of the necessity of employment of special anti-seize compounds on the threads thereof. The present coupling also has utility in numerous chemical industries and even in the food industries wherein stainless steel tubing and couplings have been employed in the conducting and sterilizing of fruit juices and the like. The nylon parts resist attack by certain acidic and alkaline liquids and yet cost but a fractional portion of stainless steel fittings.

Another feature of the coupling herein is that it is self-locking, due to its resilience and to the large difference between its static and dynamic coefficients of friction. Thus, when the ferrule 6 is tightened by hard as much as possible, it then is impossible to loosen the same except by employing a wrench or pliers. Although the couplings herein disclosed, when moderately tightened, hold smooth metal tubes T with sufficient force to resist blow-out of the tubes at pressures of about 1000 p. s. i. fluid pressure, it is recommended that the couplings be used in a service of about 150 p. s. i. so as to be safe even when only finger tight. Couplings used with rough or etched surface tubes T will, of course, safely withstand much greater blow-out pressures.

It is contemplated to dye these couplings different colors according to size and to leave undyed the couplings intended for liquid food lines and the like. The dyeing may be accomplished in boiling water which has the beneficial effects of dimensionally stabilizing the coupling parts and of relieving internal stresses.

The nylon FM-10001 from which these coupling parts are injection molded may be described as a "horny" material which is strong and hard, but yet is resilient, so as to make it the only known material suitable for a flareless tube coupling of the character described. The self-locking characteristics of the coupling are important in resisting loosening by vibration. The nylon parts themselves have good vibration-resisting qualities and serve additionally to absorb vibrations to prevent transmission of vibrations to the metal tube gripped thereby. Other synthetic plastics which have sufficient resilience for coupling use have inadequate strength and "cold flow" under pressure, thus causing leakage and requiring periodic re-tightening.

Other modes of applying the principle of the invention may be employed, change being made as regards the details described, provided the features stated in the following claim, or the equivalent of such, be employed.

I therefore particularly point out and distinctly claim as my invention:

A tube coupling comprising two threadedly engaged coupling members each molded of a plastic material having approximately the strength, modulus of elasticity, toughness, resilience, and hardness of nylon; one of said coupling members being formed with a smooth cylindrical bore therethrough and having an annular recess adjacent one end of said coupling member, the outer wall forming said recess being internally threaded throughout its length and the inner wall being frusto-conical and constituting the exterior surface of a forwardly tapered, circumferentially continuous, tubular lip which is integral with said one coupling member and which is of diameter at its large end nearly equal to the minor diameter of such internal threads, is tapered at an angle of about 9–15° with respect to the longitudinal axis of said bore to form with said bore wall a relatively thin edge, is of length approximately equal to the diameter of the bore, and is surrounded, throughout its length, by such internal threads; the other of said coupling members being formed with an annular end portion having external threads adjacent one end thereof which are engageable with said internal threads and having an inwardly directed tapered flare mouth adjacent such one end thereof which taper is complementary with said tapered lip, said end portion being receivable in said annular recess, said tapered lip and flare mouth being engageable for a length which is approximately equal to the diameter of the bore but slightly less than the length of said lip, whereby, when said coupling members are tightly screwed together, said tapered lip is elastically deformed radially inward throughout substantially its entire length to firmly grip around a tube which is adapted to be inserted through the bore of said one coupling member without permanent deformation of the wall of the tube; said tapered lip, when said coupling members are assembled as aforesaid, having a minor portion of its length axially rearward of the wedged and deformed portion unconfined by said flare mouth, whereby within that portion of said lip, the tube will be gripped with less pressure.

References Cited in the file of this patent

UNITED STATES PATENTS

| | | |
|---|---|---|
| 2,457,648 | Donner | Dec. 28, 1948 |
| 2,545,263 | Corydon II | Mar. 13, 1951 |
| 2,631,869 | Warp | Mar. 17, 1953 |
| 2,647,942 | Borden et al. | Aug. 4, 1953 |
| 2,664,458 | Rapata | Dec. 29, 1953 |
| 2,665,179 | Salvatora | Jan. 5, 1954 |
| 2,669,700 | Rauch | Feb. 16, 1954 |
| 2,696,818 | Loghem | Dec. 14, 1954 |

FOREIGN PATENTS

| | | |
|---|---|---|
| 98,001 | Sweden | Feb. 6, 1940 |
| 569,953 | France | Jan. 12, 1924 |
| 660,363 | France | Feb. 18, 1929 |
| 1,032,381 | France | Mar. 25, 1953 |